United States Patent [19]

Ishii et al.

[11] Patent Number: 4,731,776
[45] Date of Patent: Mar. 15, 1988

[54] CARTRIDGE LOADING APPARATUS

[75] Inventors: Masara Ishii, Fujiwawa; Kazuharu Odawara, Yokohama, both of Japan

[73] Assignee: Kabushiki Kaisha Toshiba, Kawasaki, Japan

[21] Appl. No.: 833,181

[22] Filed: Feb. 26, 1986

[30] Foreign Application Priority Data

Feb. 28, 1985 [JP] Japan .................................. 60-39285

[51] Int. Cl.$^4$ ........................ G11B 25/04; B65D 85/02
[52] U.S. Cl. .................................. 369/77.2; 206/312; 206/444; 360/133; 369/291
[58] Field of Search ............... 369/291, 77.2; 360/133, 360/97, 99; 206/312, 313, 309, 444

[56] References Cited

U.S. PATENT DOCUMENTS

| | | | |
|---|---|---|---|
| 4,084,540 | 4/1978 | Maier | 369/291 |
| 4,149,729 | 4/1979 | Peters | 369/291 |
| 4,443,874 | 4/1984 | Steenberg | 369/291 |
| 4,455,642 | 6/1984 | Inaba | 369/291 |
| 4,608,681 | 8/1986 | Shiosaki | 369/291 |
| 4,609,105 | 9/1986 | Manes et al. | 206/309 |

Primary Examiner—Steven L. Stephan
Attorney, Agent, or Firm—Schwartz, Jeffery, Schwaab, Mack, Blumenthal & Evans

[57] ABSTRACT

A cartridge loading apparatus is provided with a pair of locking devices for locking a cartridge received in a housing of the apparatus under a prescribed force. Each locking device includes a locking lever which is rotatable between a release position where the cartridge is set freely movable and a locking position where the locking lever engages a recess formed on each lateral side face of the cartridge, a reverse insertion prevention lever rotatable about the same shaft as the rotating shaft of the locking lever, a first spring for biasing the locking lever and the reverse insertion prevention lever to come close to each other, and a second spring for biasing the locking lever to the release position while the locking lever and reverse insertion prevention lever are biased to come close to each other. The locking lever is biased by the first spring from the release position to the locking position upon engagement between the reverse insertion prevention lever and the cartridge inserted in the housing.

10 Claims, 15 Drawing Figures

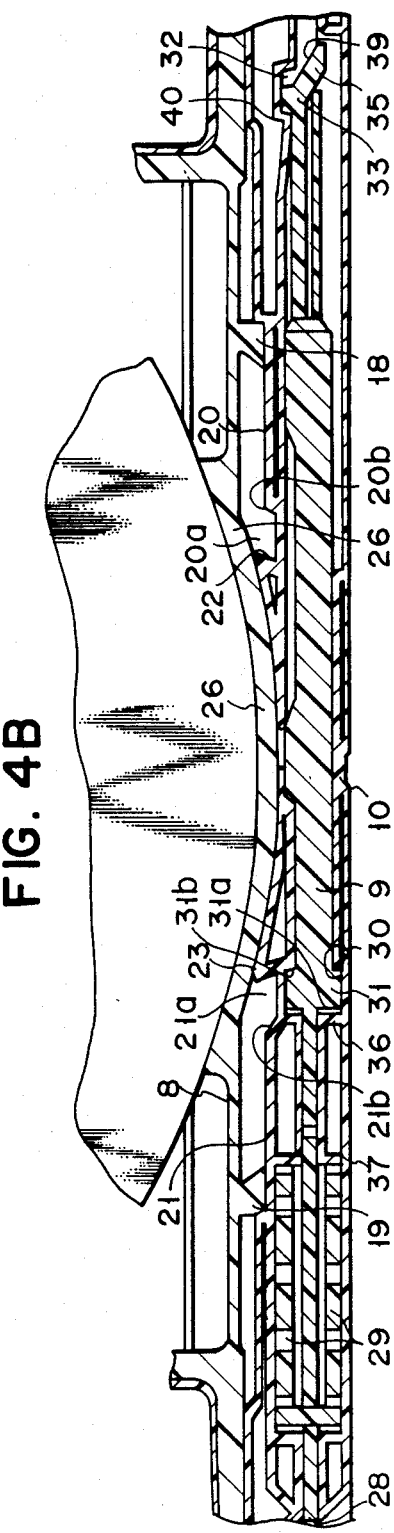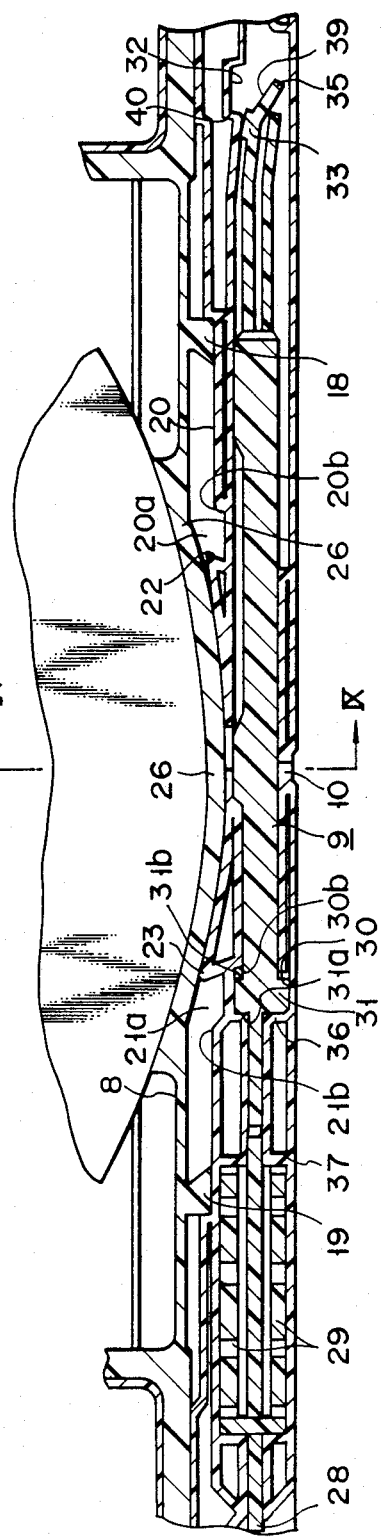

F I G. 7C
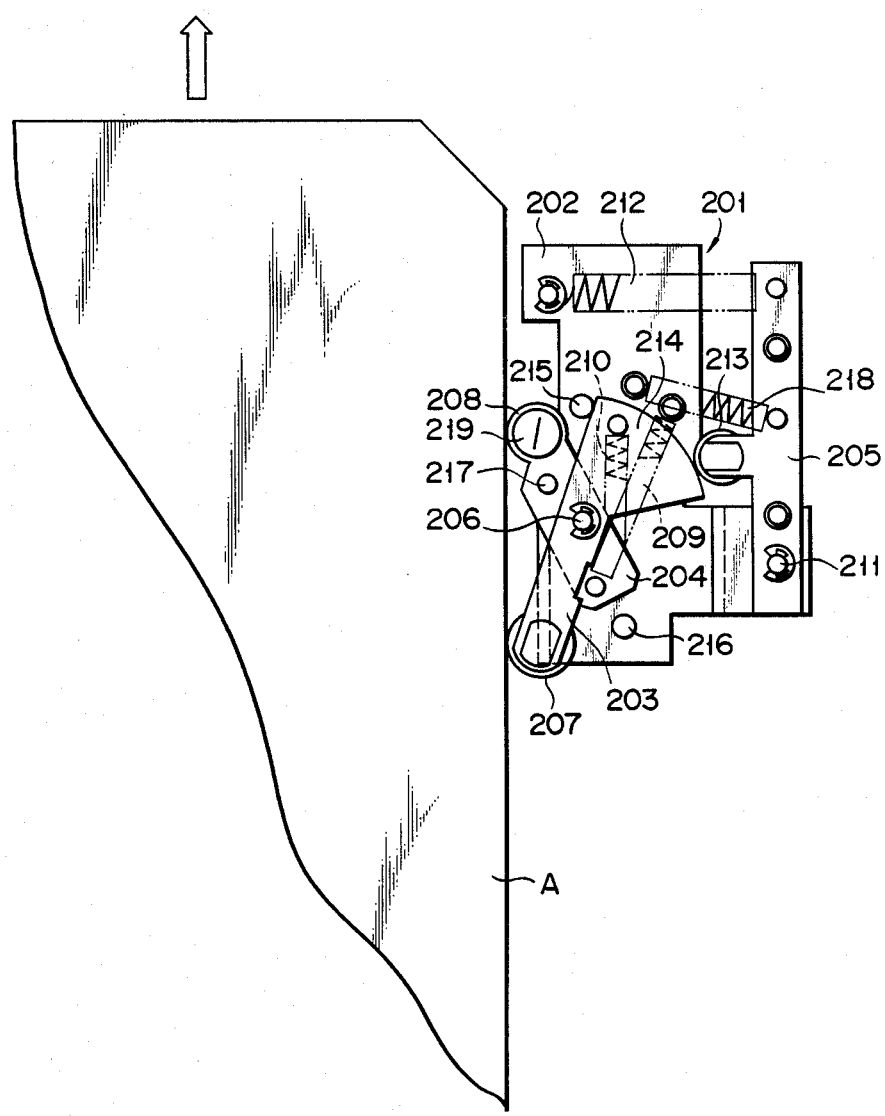

F I G. 7E
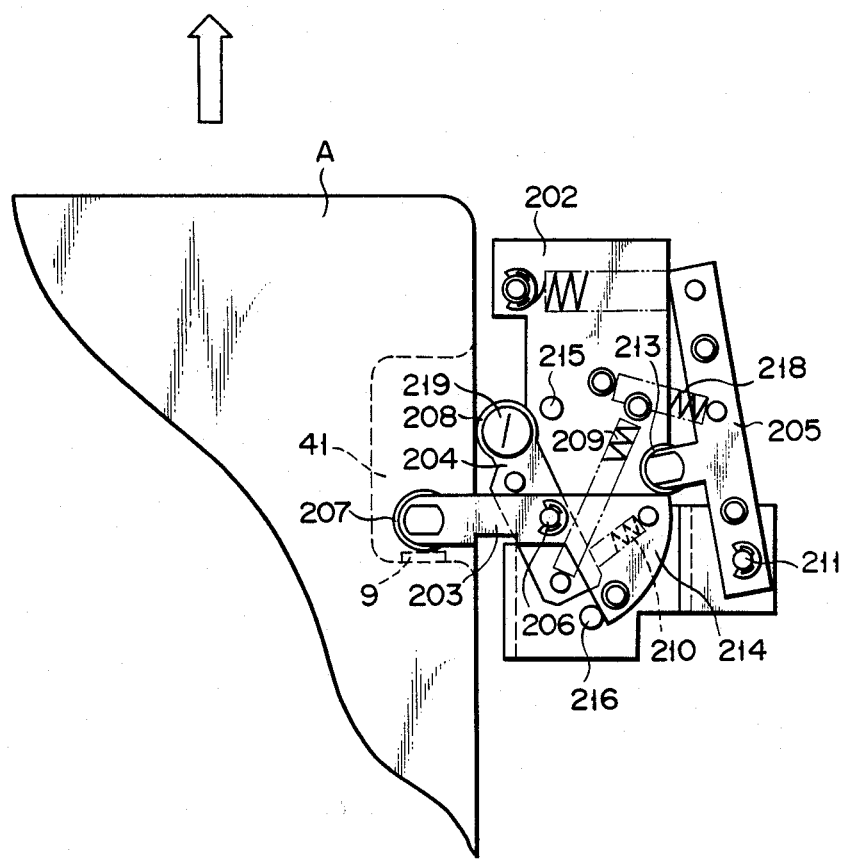

CARTRIDGE LOADING APPARATUS

BACKGROUND OF THE INVENTION

1. Field of the Invention

The present invention relates to a cartridge loading apparatus for loading a cartridge, in which an information recording medium is inserted for protection, into a housing of, for example, an information processing apparatus.

2. Description of the Prior Art

In recent information processing devices, a small laser spot is formed on a light-reflecting surface of an information recording medium such as an optical disk or a video disk to form pits corresponding to input information, thereby recording this information. A laser beam focused on the light-reflecting surface is reflected to a photosensor to reproduce desired information.

An information processing apparatus of this type has advantages of high recording density and high fidelity reproduction. When the surface of the information recording medium is scratched or dusty, or is contaminated with fingerprints or other foreign material, however, the optical path of the laser beam is obstructed. As a result, recording and reproduction cannot be properly performed.

A conventional information recording medium such as an optical disk or a video disk must be manually removed from a protective case as a cartridge. An operator must carefully load the medium on a loading section such as a turntable in the information processing apparatus so as to prevent the medium from being damaged. Conventional information recording mediums can therefore be said to be impractical for common use.

Another type of information recording medium cartridge has been proposed to protect the information recording medium. The cartridge, containing the information recording medium, is inserted into the information processing apparatus and then removed, leaving only the medium loaded in the apparatus. In order to withdraw the information recording medium after reproduction, the empty cartridge is inserted into the information processing apparatus so that the information recording medium enters the cartridge, is secured by the cartridge and then removed, together with the cartridge, from the apparatus.

According to this system, the information recording medium is removed from the cartridge in the recording and reproduction modes. If several information recording media are loaded into several different information processing devices, their empty cartridges must be kept on or near the operation desks. When the information recording media are removed from the devices, it is troublesome to have to match specific cartridges with specific media. When the information recording media are held in the cartridges at random, it is quite difficult and inconvenient to locate a desired information recording medium for later use.

An information processing apparatus has been developed to process information stored in or read out from an information recording medium held in a cartridge after inserting the cartridge medium into the apparatus. In the information processing apparatus of this type, the cartridge inserted into a cartridge insertion port is conveyed to a predetermined position and are separated to partially expose the information recording medium.

In the information processing apparatus of this type, a cartridge inserted in a cartridge insertion port must be locked in a predetermined position, part of an information recording medium must be exposed through separated cartridge cases, and the information recording medium must be housed in the locked cartridge cases upon unloading. In addition, in this information processing apparatus, care must be taken that the cartridge is not inserted backwards.

SUMMARY OF THE INVENTION

The present invention has been made in consideration of the above situation, and has as its object to provide a cartridge loading apparatus wherein a cartridge enclosing an information recording medium is loaded to a predetermined position and information can be read out from or written onto the information recording medium, and more particularly, an apparatus wherein the cartridge can be loaded to the predetermined position, the cartridge cases can be automatically locked upon unloading, and the cartridge cannot be inserted backwards.

In order to achieve the above object of the present invention, there is provided a cartridge loading apparatus for loading a cartridge which cartridge encloses an information recording disk therein, includes first and second cases each adapted for opposed sliding movement selectively between open and closed positions of said cartridge along a plane substantially coinciding with that of said disk, and is adapted to be in a closed state to completely enclose and seal the disk when the first and second cases are by said sliding movement brought into contact with each other and in an open state to expose an area of the disk between the first and second cases when the first and second cases are by said sliding movement separated from each other, said first case being provided with a recess formed in each lateral side face thereof, said apparatus comprising a housing having a port at one side of said housing for receiving and discharging the cartridge therethrough, cartridge handling means, disposed in said housing, for receiving the cartridge from said port in the closed state, for opening the cartridge by separating by said sliding movement the first and second cases from each other to expose the area of said information recording disk, for closing the cartridge by bringing by said sliding movement the first and second cases into contact with each other, and for ejecting at least part of said closed cartridge outside of said housing through said port, and locking means for locking the cartridge inserted in said housing by said cartridge handling means, said locking means including a pair of locking devices arranged beside lateral faces of the cartridge, and each locking device including a locking lever movable between a release position where the cartridge is set freely movable, and a locking position where the locking lever engages the recess, thereby locking the first case.

BRIEF DESCRIPTION OF THE DRAWINGS

The drawings show an information recording medium cartridge according to an embodiment of the present invention, in which:

FIG. 4B is a partial sectional view of a closed and locked cartridge;

FIG. 4C is a partial sectional view of a closed but unlocked cartridge;

FIG. 7C is a plan view showing the locking device where the cartridge is inserted into the housing;

FIG. 7E is a plan view showing the locking device where the ends of the cartridge are reversed and that end of the cartridge not usually inserted is inserted;

DETAILED DESCRIPTION OF THE PREFERRED EMBODIMENTS

A cartridge will be described in detail with reference to the accompanying drawings.

Figure 1:
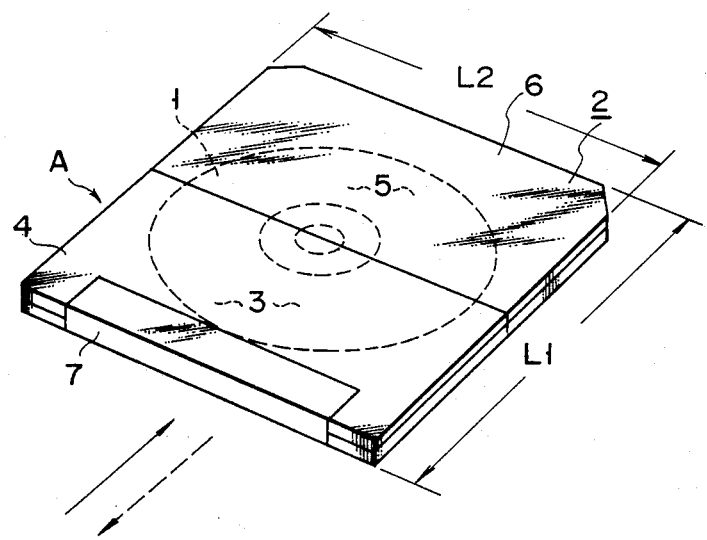
FIG. 1 is a perspective view schematically showing a state wherein a cartridge housing is closed.
Figure 2:
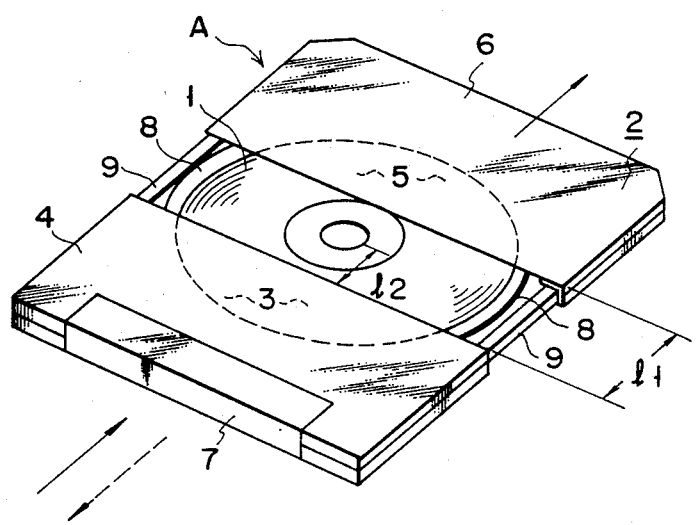
FIG. 2 is a perspective view schematically showing a state wherein the cartridge housing is open.

FIGS. 1 and 2 show an outer appearance of an information recording medium cartridge (hereinafter referred to as a "cartridge"). A for storing a disk as an information recording medium. A solid arrow indicates an insertion direction of the cartridge with respect to an information processing apparatus, and a dotted arrow indicates an ejection direction thereof. Reference numeral 1 denotes a disk; and 2, a cartridge housing for storing the disk 1.

The disk 1 has an outer diameter of about 300 mm, an inner diameter of 35 mm and a thickness of 1 to 8 mm. At least one major surface of the disk 1 has an information forming layer 1a subjected to information recording and reproduction with a laser beam or the like. In this embodiment, the information forming layer 1a is formed on each of the surfaces of the disk 1. The cartridge housing 2 comprises a first case (a rear case) 4 and second case (front case) 6 freely brought into contact with or separated from the rear case 4. The rear case 4 is located at a rear position along the insertion direction of the cartridge A and has a first storage section 3 for storing a rear half of the disk 1. On the other hand, the front case 6 is located at a front position along the insertion direction and has a second storage section 5 for storing a front half of the disk 1.

The front and rear cases 6 and 4 are made of a plastic material. A label 7 is adhered to the back of the case 4 to indicate the information contents and the sides of the disk 1.

FIG. 1 shows a state wherein the cartridge housing 2 is closed. In this state, the disk 1 is completely covered by the front and rear cases 6 and 4. At the same time, the front case 6 is locked with the rear case 4 and cannot be separated in this state. In the closed state, a dimension L1 of the cartridge housing 2 along the insertion direction of the cartridge A is longer than a dimension L2 along a direction perpendicular to the insertion direction. This prevents improper loading of the cartridge A into a recording and reproduction apparatus for processing the information on the disk 1.

FIG. 2 shows a state wherein the cartridge housing 2 is opened. When the cartridge housing 2 is inserted into the recording and reproduction apparatus, the lock of the housing is released, so that the front case 6 may be separated from the rear case 4. A distance l2 between the front and rear cases 6 and 4 in the separated state is longer than the outer diameter of a turntable (to be described later) for rotating the disk 1 or a clamper (to be described later) for fixing the disk 1 on the turntable.

A pair of disk support members 8 are disposed in the cartridge housing 2 and extend along the insertion direction of the cartridge A. The disk support members 8 are located at two sides of the housing 2 in a symmetrical arrangement and can be brought into contact with or separated from the outer peripheral portions of the disk 1. Each disk support member 8 extends across the front and rear cases 6 and 4.

When the front case 6 is separated from the rear case 4, each disk support member 8 is moved from the front and rear cases 6 and 4 along the insertion direction of the cartridge A by a distance l2 which is half of the distance l1 between the front and rear cases 6 and 4. At this moment, each support member 8 is stopped by the front and rear cases 6 and 4. In this manner, the front and rear cases 6 and 4 are stopped while they are spaced apart by the distance l1. The distance between the front and rear cases 6 and 4 will not exceed the distance l1.

Each disk support member 8 is in contact with the peripheral portion of the disk 1 and supports the disk 1 when the front case 6 is brought into contact with the rear case 4. The support member 8 is slightly separated from the peripheral portion of the disk 1 while the front case 6 is separated by the distance l1 from the rear case 4.

The disk 1 is moved upon movement of the disk support members 8 from the front and rear cases 6 and 4. The displacements of the disk support member 8 from the front and rear cases 6 and 4 are defined to be the distance l2. The disk 1 is moved until the central hole of the disk 1 is located substantially at the midpoint between the front and rear cases 6 and 4.

On the other hand, when the cartridge A is closed, the disk support members 8 are moved inside the cases 6 and 4 as the front case 6 is moved toward the rear case 4. The disk 1 is also inserted into the front and rear cases 6 and 4. Finally, the disk 1 is completely covered with the front and rear cases 6 and 4. An edge of the front case 6 is in contact with an edge of the rear case 4 when the cartridge housing 2 is kept closed.

Case support members 9 are disposed in the cartridge A along the insertion direction of the cartridge A and are located outside the disk support members 8 in a symmetrical manner. Each case support member 9 brings the front case 6 into contact with the rear case 4. In this mode, the case support members 9 keep the front and rear cases 6 and 4 at the same level horizontally. In other words, the case support members 9 serves as reinforcing members for keeping the surfaces of the front and rear cases 6 and 4 flat. Each case support member 9 serves as a guide rail for preventing the front case 6 from being inclined with respect to the rear case 4 along the separation direction when the front case 6 is separated from the rear case 4.

The cartridge A for holding the disk 1 therein mainly comprises the front case 6, the rear case 4, the disk support members 8, and the case support members 9.

The cartridge A will be described in detail with reference to FIGS. 3 to 9.

Figure 3:
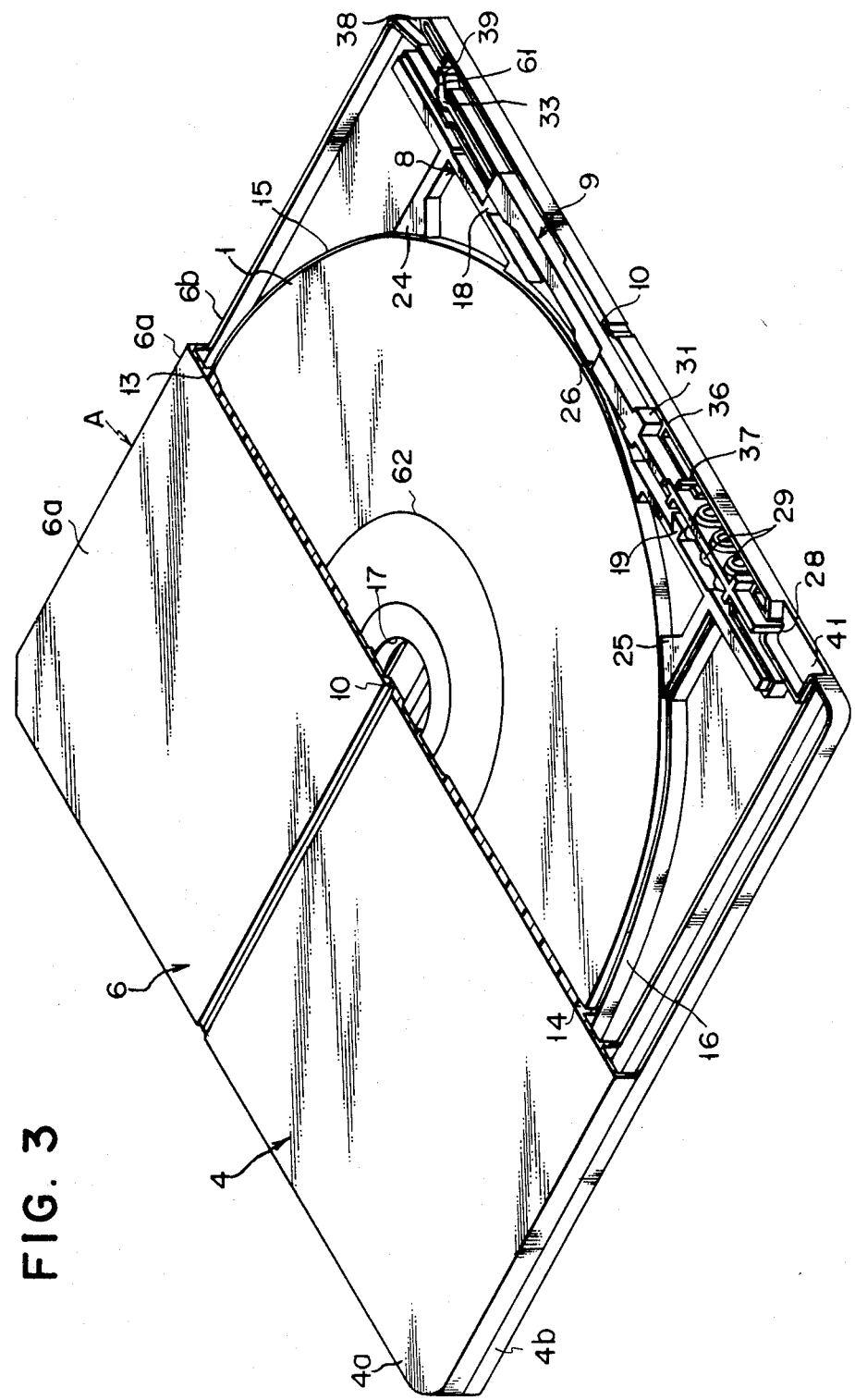
FIG. 3 is a partially cutaway perspective view showing the state wherein the cartridge housing is closed.
Figure 4A:
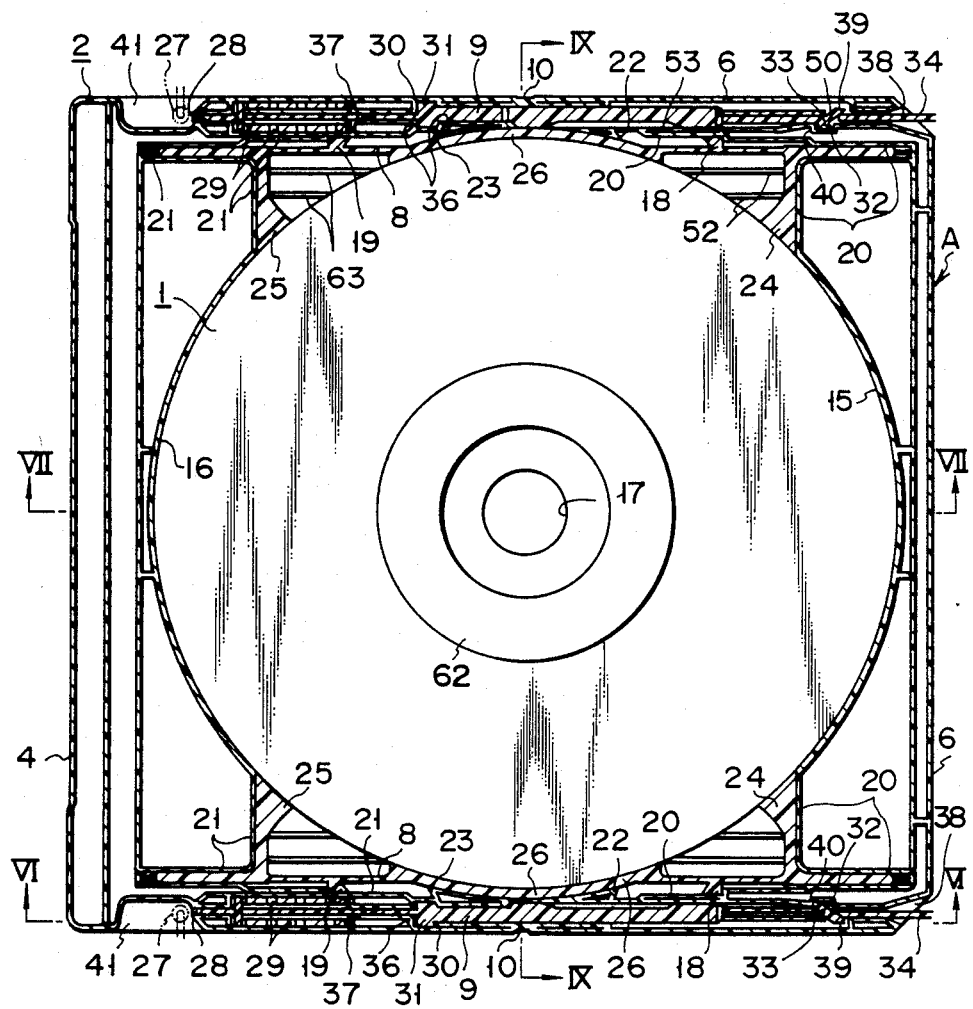
FIG. 4A is a sectional plan view showing the state wherein the cartridge housing is opened.
Figure 5:
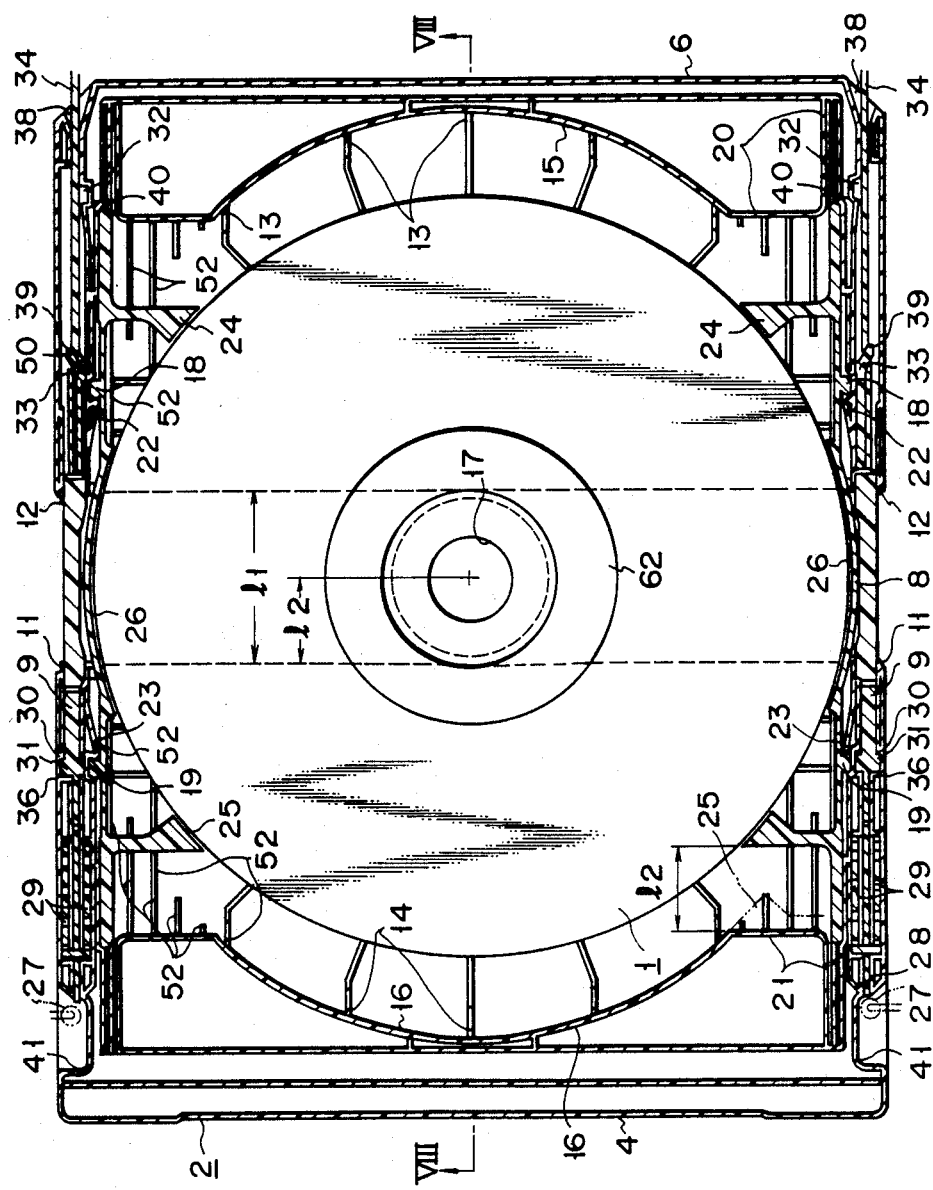
FIG. 5 is a cross-sectional plan view showing the state wherein the cartridge housing is opened.

FIG. 3 is a perspective view showing a closed state of the cartridge A with the upper surface partially cut away. FIG. 4A is a plan view showing a closed state of the cartridge A with the upper surface cut away, FIG. 4B is a partial sectional view of closed and locked cartridge, and FIG. 4C is a partial sectional view of closed and unlocked cartridge. FIG. 5 is a plan view showing the opened state of the cartridge with the upper surface cut away.

The front case 6 comprises an upper case member 6a and a lower case member 6b. The upper case member 6a is symmetrical with the lower case member 6b with respect to a joint surface so as to constitute the front case 6 as a bag-like member. The upper and lower case members 6a, 6b may be joined by means of an adhesive or screws. Similarly, the rear case 4 is constituted by upper and lower case members 4a and 4b which are symmetrical with each other about a joint surface thereof.

The internal space of the front case 6 is defined as the second storage portion 5, and the internal space of the rear case 4 is defined as the first storage portion 3. The opposing edges of the front and rear cases 6 and 4 are open. When the cartridge housing 2 is closed, the front case 6 is brought into contact with the rear case 4 such that the openings of the first and second storage portions 3 and 5 for storing the disk 1 communicate with each other. A fitting portion 10 is defined by joint surfaces of the front and rear cases 6 and 4 to prevent dust from entering the housing if the front case 6 becomes misaligned with the rear case 4. The fitting portion 10 comprises a V-shaped projection 11 formed on the rear case 4 and a V-shaped groove 12 which is formed in the front case 6 and which can engage with the projection 11.

Upper and lower fixing ribs 13 and 14 are formed on the front and rear cases 6 and 4 to vertically support the peripheral portion of the disk 1 when the cartridge housing 2 is closed. In this manner, when the cartridge housing 2 is closed, the disk 1 is supported by the upper and lower fixing ribs 13 and 14 in such a manner that the information recording region of the disk will not be brought into contact with the inner surfaces of the cases. Radial fixing ribs 15 and 16 are formed on the front and rear cases 6 and 4, respectively, to regulate the radial movement of the disk 1 when the cartridge housing 2 is closed. When the cartridge housing 2 is opened, however, the disk 1 is disengaged from the vertical fixing ribs 13 and 14 and the radial fixing ribs 15 and 16 and is freely movable in the cartridge housing 2. When the cartridge 2 is closed, the disk 1 is fixed in the cartridge housing 2. When the cartridge housing 2 is opened, the disk 1 is freely movable in the cartridge housing 2.

The disk support members 8 move the disk 1 such that a central hole 17 of the disk 1 is substantially aligned with the midpoint between the front and rear cases 6 and 4 when the cartridge housing 2 is opened. Each disk support member 8 also defines the separation distance l1 between the front case 6 and the rear case 4. Each disk support member 8 has pawls 18 and 19 serving as lock portions for defining the opening distance. The pawl 18 is located inside the front case 6, and the pawl 19 is located inside the rear case 4. The pawls 18 and 19 are in contact with guide ribs 20 and 21 formed in the front and rear cases 6 and 4, respectively, when the cartridge housing 2 is closed, as shown in FIG. 4A.

When the cartridge housing 2 is opened, the pawls 18 and 19 are moved along the guide ribs 20 and 21. Aligning ribs 22 and 23 are formed on the guide ribs 20 and 21 to engage with the pawls 18 and 19, respectively. Recesses 20a and 21a are formed at those portions of the guide ribs 20 and 21 which are located immediately in front of the aligning ribs 22 and 23, respectively. Side surfaces of the ribs 20 and 21 comprise inclined surfaces 20b and 21b, respectively. The pawls 18 and 19 are guided along the inclined surfaces 20b and 21b formed in the ribs 22 and 23 and are fitted in the recesses 20a and 21a when the pawls 18 and 19 reach the aligning ribs 22 and 23, respectively. When the cartridge housing 2 is opened in this manner, each disk support member 8 is moved outside by several millimeters from the disk 1 along the radial direction thereof.

When the pawls 18 and 19 are engaged with the aligning ribs 22 and 23 on the front and rear cases 6 and 4, respectively, the front case 6 will no longer be separated from the rear case 4. When the cartridge housing 2 is closed, each disk support member 8 is arranged such that the corresponding pawls 18 and 19 are moved by the distance l2. In other words, each disk support member 8 is moved to extend outward by the distance l2 from the front and rear cases 6 and 4. Therefore, each disk support member 8 is located at the midpoint between the front and rear cases 6 and 4. The disk support members 8 may be regarded as stationary members. In this case, the front and rear cases 6 and 4 are regarded as separated in opposite directions by a distance l2 with respect to the disk support members 8.

Disk holding portions 24, 25, and 26 are formed in each disk support member 8 to be brought into contact with the peripheral portion of the disk 1. The disk holding portion 24 is located within the case 6 and can be brought into contact with a peripheral portion of the disk 1 which is located within the second storage portion 5. The disk holding portion 25 is located within the rear case 4 and can be brought into contact with a peripheral portion of the disk 1 which is located in the first storage portion 3. The central disk holding portion 26 has an arcuate shape and can be brought into contact with a peripheral portion of the disk 1 which is located between the disk holding portions 24 and 25. In this manner, the disk 1 is moved upon movement of the disk support members 8.

As described above, each disk support member 8 is moved by the distance l2 from the front and rear cases 6 and 4. Therefore, when the cartridge housing 2 is closed and the disk central hole 17 is located at the abutment portion between the front and rear cases 6 and 4, the disk central hole 17 is located at the center between the front case 6 and the rear case 4 when the cartridge housing 2 is opened.

As previously described, when the pawls 18 and 19 are engaged with the aligning ribs 22 and 23, respectively, each disk support member 8 is moved by several millimeters outside the disk 1 along the radial direction thereof. Therefore, the disk support member 8 is then separated by several millimeters outwardly from the disk 1, so that the disk 1 is free from any engagement.

When the disk 1 is free from the front case 6, the rear case 4, and the disk support members 8 in the cartridge A, the disk 1 is brought into contact with the lower inner surfaces of the front and rear cases 6 and 4.

In this state, the upper and lower surfaces of the disk 1 are nearly in contact with the surfaces of the cases 6 and 4. In order to prevent the information recording regions of the disk 1 from being damaged, a ring-shaped label 62 having a thickness of 0.3 to 1 mm is adhered to a central portion of each of the upper and lower surfaces of the disk 1. The portion of the disk 1 which corresponds to the information recording region floats above the corresponding inner surfaces of the cases 6 and 4 due to the presence of these labels 62. In this manner, damage to the disk 1 in the cartridge housing 2 is prevented.

The disk support members 8 are arranged such that the arcuate central disk holding portion 26 and the disk holding portions 24 and 25 are in contact with the disk peripheral portions when the cartridge housing 2 is closed. In this state, the disk 1 cannot be moved along the radial direction thereof. In this condition, the case support members 9 serve to couple the front and rear cases 6 and 4 when the cartridge housing 2 is closed and to keep the cartridge housing 2 closed by the case support members 9. Each case support member 9 extends along the insertion direction of the cartridge A and is present at the outer side of the corresponding disk support member 8. One end (left end in FIGS. 4 and 5) of each case support member 9 is fitted inside the rear case 4 when the upper case member 4a is assembled with the lower case member 4b in the rear case 4. When the case support members 9 are assembled integrally with the rear case 4 and cannot be removed from the rear case 4.

A portion of each case support member 9 which is located in the rear case 4 integrally comprises a rear end portion 28 as a second press member which is mounted outside the rear case 4 which is urged by a case lock member 203 (to be described later) of the information processing apparatus; a spring 29 as a biasing member; and a projection 31 as a first engaging portion for engaging with a recess 30 as a first engaging portion formed in the rear case 4. A portion of each case support member 9, which is located in the front case 6, integrally comprises a case fixing pawl 33 as a second engaging portion to be engaged with a recess 32 formed in the front case 6. A first press member 35 urged by a case release rod 34 as a case release member mounted on the cartridge loading portion.

As shown in FIGS. 4B and 4C, each case support member 9 can be moved by several millimeters in the rear case 4 along the insertion direction of the cartridge A. In order to limit the displacement of the case support member 9, an aligning rib 36 is formed on the rear case 4 to define an end face of the recess 30 engaged with the corresponding projection 31. A length of the recess 30 along the insertion direction is longer by several millimeters than the thickness of the projection 31 along the insertion direction.

The free end of the spring 29 of each case support member 9 abuts against a spring fixing rib 37 in the rear case 4. When the case support members 9 are mounted in the rear case 4, the corresponding springs 29 are slightly compressed. Therefore, each spring 29 biases the corresponding case support member 9 in the ejection direction of the cartridge A. As shown in FIG. 4C, a surface 31a of the projection 31, which is located at the side of the spring 29, abuts against the corresponding aligning rib 36, so the cartridge A will not be normally moved along the ejection direction. In the state shown in FIG. 4C, the case fixing pawl 33 is disengaged from the recess 32, and hence the rear case 4 is not locked with the front case 6.

When the cartridge housing 2 is closed and the rear case 4 is locked with the front case 6, the case fixing pawl 33 mounted at the distal end of each case support member 9 is engaged with a case fixing pawl rib 40 defining an end face of the recess 32 of the front case 6. In this state, each case support member 9 is pushed to the right from the state shown in FIG. 4C to the state shown in FIG. 4B, and the corresponding spring 29 is compressed to bias the front case 6 toward the rear case 4. At the contact portion between the front and rear cases 6 and 4, the projection 11 is firmly engaged with the groove 12. As a result, the disk 1 is completely covered by the cartridge housing 2.

When the cartridge housing 2 is closed and locked, a small space is formed between a surface 31b of the projection 31 and a surface 30b of the recess 30. Even if the front case 6 is removed by a strong force from the rear case 4, the surface 31b of the projection is moved and abuts against the surface 30b of the recess 30, so that the front case 6 is separated only slightly from the rear case 4. In this manner, an excessive force need not be applied to the springs 29. When the separating force acting between the front and rear cases 6 and 4 is stopped, they are returned to the initial state by the biasing forces of the springs 29.

In order to open the cartridge housing 2 from the state shown in FIG. 4B, the case fixing pawls 33 of the case support members 9 are disengaged from the case fixing pawl ribs 40 defining the end faces of the recesses 32 of the front case 6, respectively. For this purpose, a case release rod insertion port 38 is formed at each front portion of the front case 6 to oppose the distal end of the corresponding case support member 9. The thin case release rods 34 are inserted in the corresponding insertion ports 38 to be urged against inclined surfaces 39 of the first press portions 35 of the case support members 9. Then, the first press portions 35 are moved outside of the front case 6, so that the case fixing pawls 33 are disengaged from the case fixing pawl ribs 40, respectively.

When the case fixing pawls 33 are released from the ribs 40, the case support members 9 move inward by several millimeters toward the rear case 4 by means of the biasing forces of the tension springs 29. In this state, the housing is maintained in the unlocked state.

On the other hand, in order to lock the housing 2 from the unlocked state shown in FIG. 4C, the case fixing pawls 33 are engaged with the corresponding case fixing pawl ribs 40. Since the case support members 9 have been moved by several millimeters toward the rear case 4 by means of the springs 29, respectively, the case fixing pawls 33 will not be engaged with the ribs 40 by only bringing the abutment portion of the rear case 4 into contact with that of the front case 6, as shown in FIG. 4C. In view of this, a recess 41 is formed in each portion (of the rear case 4) where the corresponding rear end portion 28 of the case support member 9 is exposed.

While the abutment portion of the rear case 4 is kept in contact with that of the front case 6, the rear end portions 28 of the case support members 9 are pushed several millimeters by the case lock members 203 (schematically shown in FIG. 4A) along the front case 6, thereby engaging the case fixing pawls 33 and the ribs 40. The case fixing pawl 33 of each case support member 9 has an elastic property and is inserted in the corresponding recess 32. Therefore, the case fixing pawl 33 will not be disengaged from the case fixing pawl rib 40 unless the inclined surface 39 is pushed.

The case support members 9 serve not only to bring the front case 6 into contact with the rear case 4 but also to keep the surfaces of the front and rear cases 6 and 4 flat. The case support members 9 also serve as guide rails for the front and rear cases 6 and 4 when the cartridge housing 2 is opened and closed.

In order to insert the disk 1 in an empty cartridge housing 2, the pair of case support members 9 are assembled in the rear case 4, and the pair of disk support members 8 are inserted therein. The disk 1 is inserted in, and surrounded by, the disk support members 8. Finally, the distal end portions of the disk support members 8 mounted in the rear case 4 and the case support members 9 are respectively inserted in the openings of the front case 6. In this manner, the disk support members 8 are elastically deformed, and the pawl 18 is moved over the aligning ribs 22, thereby mounting the disk support members 8 in the front case 6.

On the other hand, in order to remove the disk 1 from the cartridge housing 2, the following operation is performed. The case fixing pawls 33 are disengaged from the corresponding ribs 40, and the cartridge housing 2 is opened halfway. The thin rods are respectively inserted in the openings to disengage the pawls 18 from the aligning ribs 22 to separate the front case 6 from the rear case 4.

The construction and the operation of the recording and reproduction apparatus B for handling the cartridge A will be described with reference to FIGS. 6 to 9.

Figure 6:
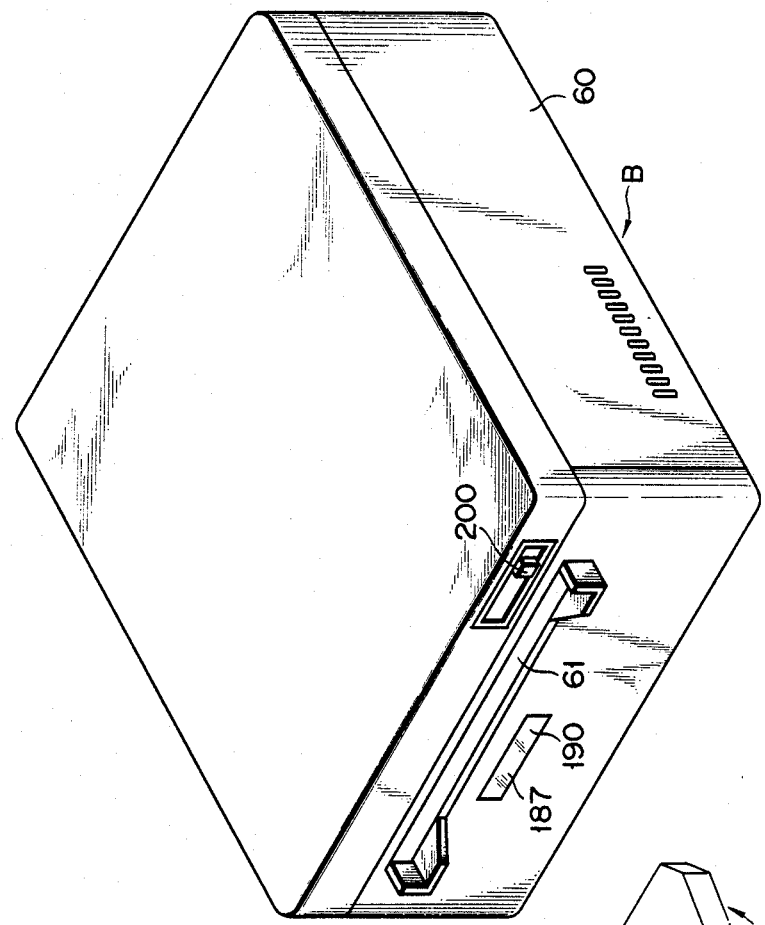
FIG. 6 is a perspective view showing the outer appearance of a recording and reproduction apparatus.
Figure 6:
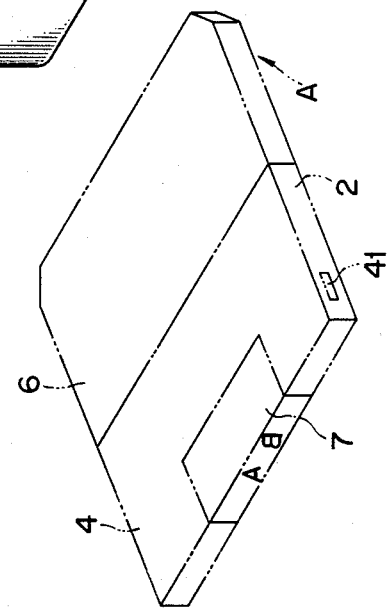
Figure 7A:
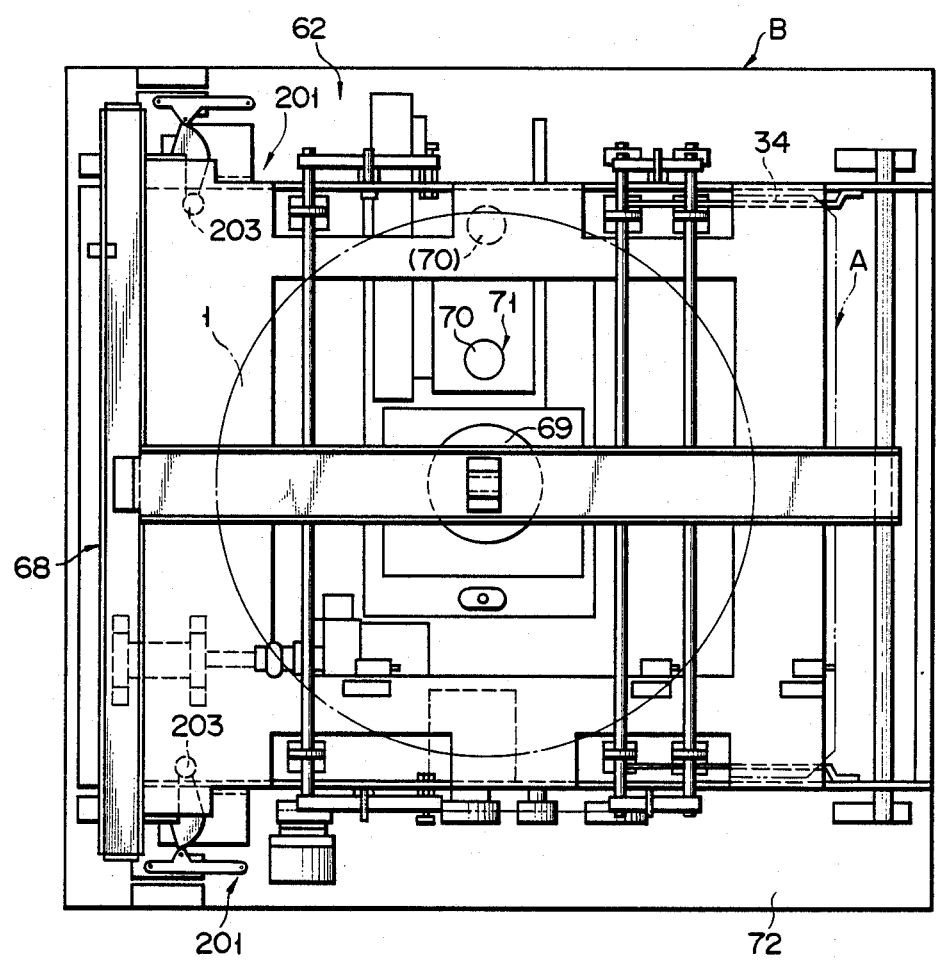
FIG. 7A is a plan view schematically showing the internal construction of the recording and reproduction apparatus.

Referring to FIG. 6, reference numeral 60 denotes an apparatus housing. A cartridge A port 61 is formed in a front panel of the housing 60 to insert and remove the cartridge A with respect to the apparatus. As shown in FIG. 7A, cartridge loading and ejection mechanism 62 and a cartridge opening and closing mechanism 63 constitute a cartridge handling unit 64 which is mounted in the housing 60. The unit 64 can be vertically moved. The cartridge loading and ejection mechanism 62 loads the cartridge A inserted into the cartridge port 61 or ejects the cartridge from the port 61. The cartridge opening and closing mechanism 63 separates the case 4 and 6 to partially expose the disk 1 from the cartridge A or brings the case 4 into contact with the case 6 to cover the disk 1.

As shown in FIG. 7A, locking devices 201 are respectively located on either side of cartridge A inserted in housing 60, and holds it with a predetermined force. When cartridge A is unloaded, rear end portions 28 of case support members 9 are urged to lock front case 6 with rear case 4. However, when cartridge A is accidentally inserted backwards in housing 60, insertion is mechanically interrupted by devices 201. Devices 201 also elastically guide the two sides of cartridge A being inserted in housing 60.

The construction of each locking device 201 will be described with reference to FIG. 7B.

Device 201 has flat base member 202. First rotating shaft 206 extends upward from member 202. Locking lever 203 and reverse insertion prevention lever 204 are pivotally mounted on shaft 206 at their centers. Bearings 207 and 208, as rolling contact members, are rotatably mounted on one end of levers 203 and 204, which are closer to cartridge A.

First mounting pin 203a extends downward from the other end of lever 203. Second mounting pin 204a extends downward from the other end of lever 204. Third mounting pin 202a extends upward from member 202 at a position opposite the end of lever 203 mounting bearing 207. First spring 209 is mounted between pins 204a and 202a to bias lever 204 counterclockwise in FIG. 7B. Second spring 210 is mounted between pins 203a and 202a to cause levers 203 and 204 to come close to each other, i.e., to bias lever 203 clockwise.

First stopper pin 215 extends upward from member 202 to stop the left edge at the other end of lever 203 pivoted by the biasing force of spring 209. When lever 203 abuts against pin 215, bearing 207 arranged at the proximal end thereof is located slightly away from the side edge of inserted cartridge A.

Third stopper pin 217 extends upward from lever 204. Although levers 203 and 204 are biased to come close to each other by the biasing force of spring 210, lever 203 abuts against pin 217 so that it does not come close enough to lever 204 below a predetermined angle therebetween. Levers 203 and 204 are located by springs 209 and 210 and pins 215 and 217 at the positions in FIG. 7B when cartridge A is not inserted in housing 60. More specifically, bearing 208 mounted at one end of lever 204 is located to engage with the side edge of cartridge A when it is inserted in housing 60.

Second stopper pin 216 extends upward from member 202 to regulate a clockwise pivotal angle of lever 203. Since the right edge at the other end of lever 203 abuts against pin 216, lever 203 extends along a direction substantially perpendicular to the insertion direction of cartridge A.

Figure 7B:
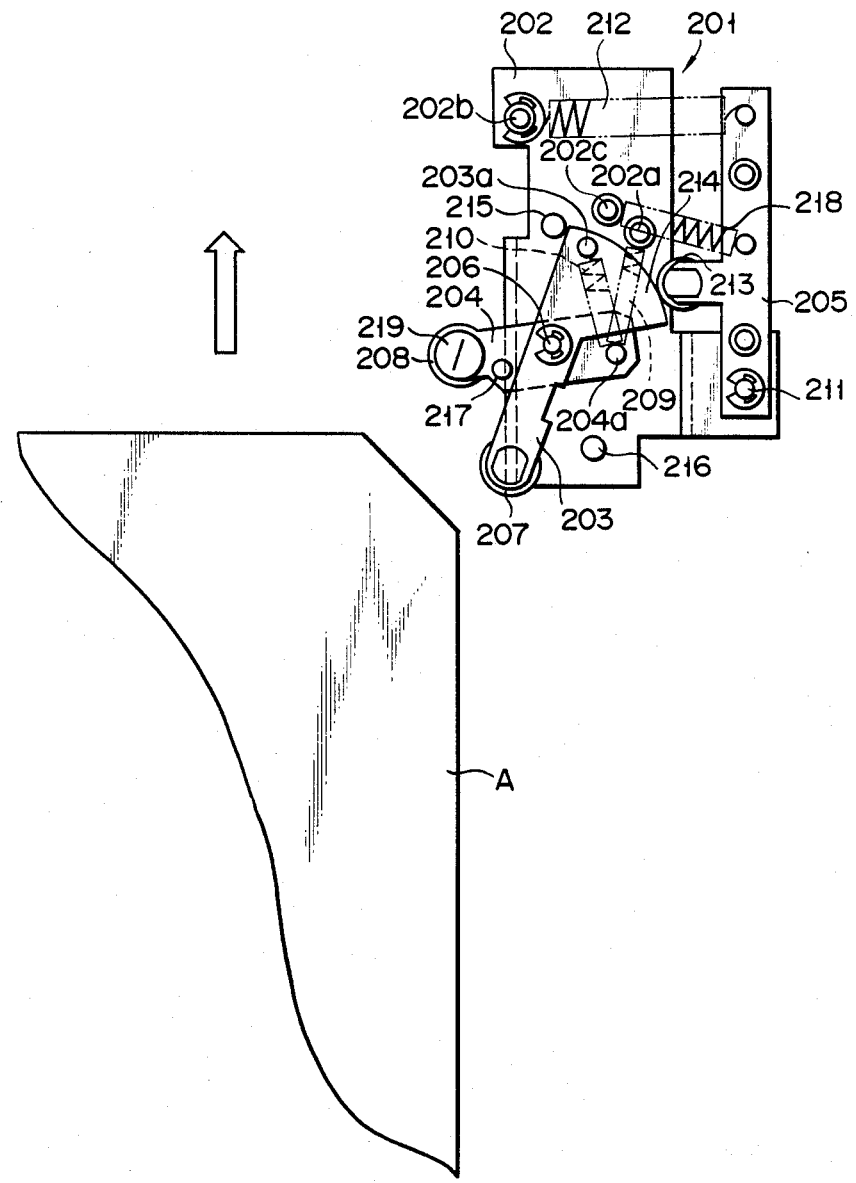
FIG. 7B is a plan view showing a locking device.

The end face of the other end of lever 203 has arc portion 214 arcuated at a predetermined angle, as illustrated in FIG. 7B. The predetermined angle is large enough to engage bearing 213 of excitation lever 205, with the right side of portion 214 while lever 203 abuts against pin 215. Bearing 213 of lever 205 is located such that it is disengaged from the left side of portion 214, and engages with the left side of lever 203 adjacent portion 214.

Second rotating shaft 211 extends from the end of base member 202 on the port 61 side. One end of lever 205 is pivotally mounted on shaft 211. Lever 205 is arranged to extend substantially along the insertion direction of cartridge A. Bearing 213 is pivotally mounted at the intermediate portion of lever 205 so as to abut against arc portion 214 of lever 203.

Fourth and fifth mounting pins 202b and 202c extend from an end of member 202 at the side opposite shaft 211 and at the central portion of member 202, respectively. Third and fourth springs 212 and 218 are arranged between the other end of lever 205 and pin 202b and between the central portion of lever 205 and pin 202c, respectively, causing bearing 213 to abut against portion 214 with a predetermined biasing force. It should be noted that spring 218 can be omitted if a biasing force of spring 212 is sufficient.

The operation of the pair of locking devices 201 with the arrangement described above will be described hereinafter.

Lever 203 is biased by springs 209 and 210 to simultaneously abut against pin 217 of lever 204 and stopper 215 when cartridge A is not inserted in housing 60, as shown in FIG. 7B. In this case, bearing 213 of lever 205 is engaged with portion 214 of lever 203.

When an operator inserts cartridge A into housing 60 through port 61, bearings 208 of levers 204 are respectively engaged with sides of cartridge A. As shown in FIG. 7C, lever 204 is pivoted clockwise against the biasing force of spring 209. It should be noted that lever 204 in the locking device (not shown in FIG. 7C) on the other side of the cartridge A is pivoted counterclockwise. In the following description, only rightside locking device 201 is exemplified.

Upon clockwise pivotal movement of lever 204, lever 203 is also pivoted clockwise by the biasing force of spring 210 and elastically abuts against the side of cartridge A.

In the state shown in FIG. 7C, the two sides of cartridge A are guided by bearings 207 and 208 of devices 201, so that it can be properly conveyed.

When cartridge A is further inserted, recesses 41 formed at two sides of cartridge A oppose devices 201, respectively. When this state is reached, lever 203 is pivoted clockwise by spring 210 and is inserted in corresponding recess 41. For this reason, bearing 207 mounted on one end of lever 203 abuts against portion 28 of member 9 appearing in recess 41. Lever 203 abuts against pin 216 and is stopped.

Figure 7D:
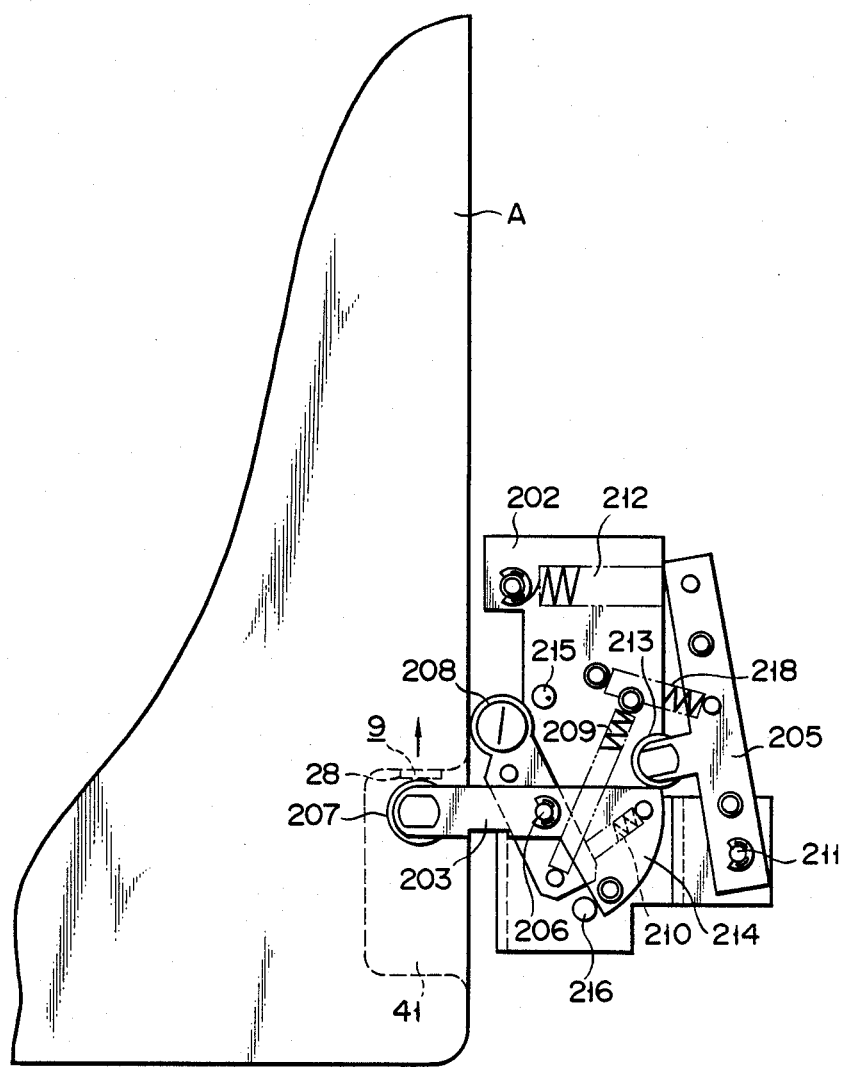
FIG. 7D is a plan view showing the locking device where the cartridge is locked by the locking device.
Figure 8:
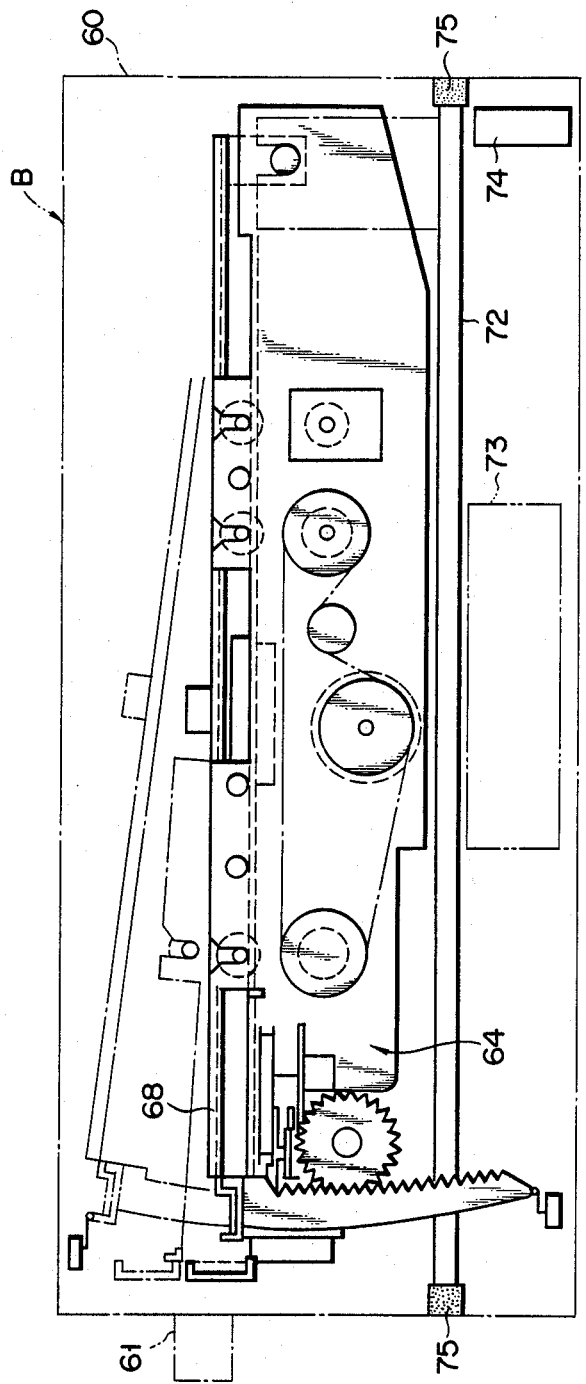
FIG. 8 is a side view schematically showing the internal construction of the recording and reproduction apparatus.

While lever 203 is inserted in recess 41, portion 214 of lever 203 is pivoted and disengaged from bearing 213 of lever 205. As shown in FIG. 7D, lever 205 is pivoted counterclockwise by the biasing forces of springs 212 and 218. Upon pivotal movement of lever 205, bearing 213 of lever 205 abuts against the left side of lever 203 with a predetermined force (this force depends on the biasing forces of springs 212 and 218).

This clamping of the other end of lever 203 between stopper 216 and bearing 213 at the predetermined force completes the locking state. In this state, Insertion of cartridge A is stopped while it is locked by devices 201 and located completely inside housing 60.

Unloading cartridge A from the state shown in FIG. 7D will be described below.

When cartridge A is biased to be unloaded from the locked state in FIG. 7D, portion 28 of member 9 appearing in recess 41 of cartridge A is urged by bearing 207 of lever 203 in the direction indicated by the arrow. Upon this urging, pawl 33 of member 9 is stopped by rib 40 so that cases 6 and 4 are locked together.

When cartridge A is further biased, a larger force acts on lever 203. When this force exceeds the locking force of lever 203 which is defined by springs 212 and 218, lever 203 is pivoted counterclockwise against the biasing forces of springs 212 and 218 so as to bring bearing 213 onto portion 214. The locking state of cartridge A by each device 201 is thus released, and cartridge A can be gradually removed. In response to the removal of cartridge A, lever 203 in device 201 is pivoted counterclockwise against the biasing force of spring 210, thereby returning to the state shown in FIG. 7C.

When cartridge A urges member 9 in the direction indicated by the arrow in FIG. 7D and does not engage pawl 33 of member 9 with rib 40, cases 6 and 4 are not locked together. However, cases 6 and 4 can be locked by levers 203 of devices 201 in response to removal of cartridge A. In this manner, cartridge A can be unloaded while cases 6 and 4 are not separated from each other.

Backwards insertion of cartridge A will be described with reference to FIG. 7E.

When cartridge A is inserted backwards from the state shown in FIG. 7C, recesses 41 of cartridge A oppose devices 201 when cartridge A is only slightly inserted in housing 60. In this state, as described above, lever 203 is pivoted clockwise and is inserted in corresponding recess 41. Pivotal movement of lever 203 is stopped at a state where lever 203 is in a direction perpendicular to the insertion direction of cartridge A. Therefore, cartridge A inserted backwards cannot be further inserted in housing 60 because of the locked position of lever 203.

It should be noted that pin 219 is mounted at one end of lever 204 so that bearing 208 will not be inserted in recess 41.

Cartridge A inserted backwards and stopped by device 201 can be removed in the same way as the operation for removing the correctly inserted cartridge A. That is, lever 203 is pivoted such that bearing 213 of lever 205 overrides portion 214 of lever 203.

Figure 9:
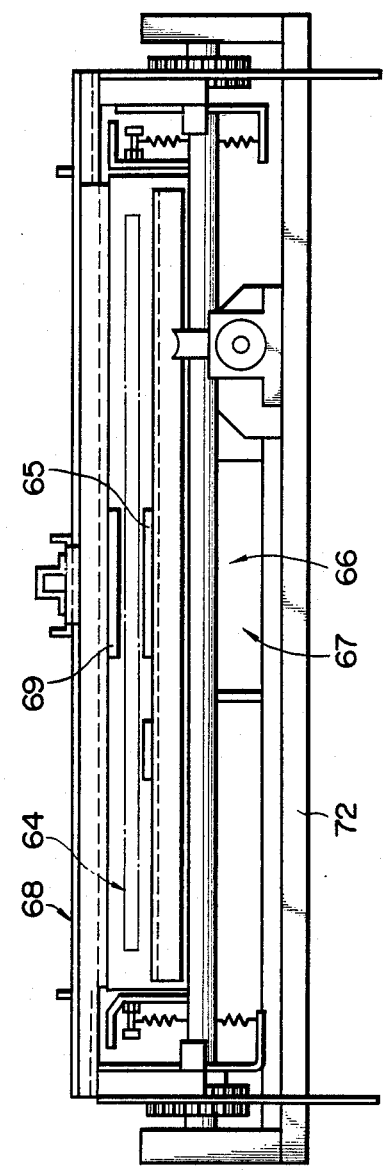
FIG. 9 is a front view schematically showing the internal construction of the recording and reproduction apparatus.

A turntable 65, as a medium holding means, and a disk drive unit 67, as a medium drive means with a motor 66 for driving the turntable 65, are arranged substantially at the center of the apparatus housing 60, as shown in FIG. 9.

A unit displacement mechanism 68 (FIG. 8) and a clamper 69 (FIGS. 7A and 9) as a disk pressing means are arranged in the housing 60. The unit displacement mechanism 68 displaces the unit 64 so as to load and unload the disk 1 with respect to the turntable 65. The clamper 69 is moved simultaneously when the unit 64 is displaced by the mechanism 68 so as to press the disk 1 on the turntable 65.

A recording and playback head 70 and an information processing mechanism 71 are also arranged in the housing 60. The head 70 opposes an exposed portion of the disk 1 which is located between the separated cases 4 and 6, as shown in FIG. 7A. The information processing mechanism 71 moves the head 70 to record information on, or reproduce it from, the disk 1.

Referring to FIGS. 7A to 9, reference numeral 72 denotes a chassis for vertically dividing the housing 60 into two compartments. The upper compartment is a mechanical compartment, and the lower compartment is a control compartment. As shown in FIG. 12, a control section 73 and a cooling fan 74 are housed in the control compartment. A packing 75 is installed in a space between the periphery of the chassis 72 and an outer cover of the housing 60.

In the recording and reproduction apparatus B of this construction, a cartridge loading mechanism 150 is mounted on the chassis 72, the control section 73 is arranged under the chassis 72, and the packing 75 is installed in the space between the periphery of the chassis 72 and the outer cover of the housing 60. The upper and lower compartments are completely isolated by the chassis 72. An air flow is produced by the cooling fan 74 only in the control compartment under the chassis 72. Therefore, air heated by the control section 73 is discharged outside the housing 60 to cool the control section 73. In this manner, heat from the control section 73 does not directly influence the disk 1 above the chassis or reading of information. Similarly, dust contained in external air outside the housing 60 drawn in the cool the control section 73 will not enter the housing above the chassis 72 (mechanical compartment).

What is claimed is:

1. An apparatus for loading a cartridge which encloses an information recording disk therein, wherein said cartridge includes first and second cases selectively movable in opposite directions by a sliding movement along a plane substantially coinciding with that of said disk, and is adapted to be in a closed state to completely enclose and seal said disk when said first and second cases are by said sliding movement brought into contact with each other and in an open state to expose an area of said disk between said first and second cases when said first and second cases are by said sliding movement separated from each other, said first case having lateral side faces extending in the movable direction of said first case, said side faces being provided with a recess, and fixing means for locking said cartridge in said closed state, said apparatus comprising:

a housing having a port at one side of said housing for receiving and discharging said cartridge therethrough;

cartridge handling means, disposed in said housing, for receiving said cartridge from said port in said closed state, for opening the cartridge by separating by said sliding movement the first and second cases from each other to expose the area of said information recording disk, for closing the cartridge by bringing by said sliding movement the first and second cases into contact with each other, and for ejecting at least part of said closed cartridge outside of said housing through said port;

locking means for locking said cartridge inserted in said housing in position, said locking means including a pair of locking devices arranged beside said lateral faces of said first case of said cartridge, and each locking device including a locking lever movable between a release position where said cartridge is set freely movable, and a locking position where the locking lever is inserted in said recess, thereby locking said cartridge in position; and for cooperating with said fixing means to lock said cartridge in a closed state when said cartridge is discharged from said housing.

2. The apparatus according to claim 1, wherein said locking means includes:

biasing means for biasing said locking lever to said release position when the cartridge is not inserted in said housing and to said locking position when said cartridge is inserted in said housing; and holding means for holding said locking lever in said locking position with a predetermined force, whereby when said cartridge is inserted in said housing, said locking lever abuts, by action of said biasing means, against said lateral face of said first case of said cartridge, and said locking lever is inserted in said recess and engages therewith when said recess opposes said locking device.

3. The apparatus according to claim 2, wherein said locking means includes a base member and a first rotating shaft, said locking lever being pivotally mounted on said base member through said first rotating shaft.

4. The apparatus according to claim 3, wherein said biasing means comprises:

an auxiliary lever pivotally mounted on said first rotating shaft that pivots upon engagement with said cartridge when said cartridge is inserted in said housing;

a first biasing member for biasing said locking lever and said auxiliary lever to come close to each other; and a second biasing member for biasing said locking lever to the release position while said locking lever and said auxiliary lever are biased to come close to each other, whereby said locking lever is biased by said biasing means from the release position to the locking position upon engagement between said auxiliary lever and said cartridge inserted in said housing.

5. The apparatus according to claim 4, wherein rolling members which are in rolling contact with the lateral side face of said first case of said cartridge are rotatably mounted at distal ends of said locking lever and said auxiliary lever, respectively.

6. The apparatus according to claim 4, wherein said locking means comprises first and second stoppers mounted on said base member and which define said release and locking positions.

7. The apparatus according to claim 3, wherein said holding means includes:

a second rotating shaft mounted on said base member at a position different from that of said first rotating shaft;

an excitation lever rotatably mounted on said second rotating shaft;

an engaging portion mounted on said excitation lever and adapted to engage with a side surface and an end face of a first end of said locking lever, which is opposite a second end inserted in said recess; and a third biasing member for biasing said engaging portion with said first end of said locking lever, whereby said engaging portion is elastically engaged through said third biasing member with a side surface of said first end of said locking lever in said locking position, thereby holding said locking lever in said locking position.

8. The apparatus according to claim 7, wherein the end face of said first end of said locking lever has an arcuated surface.

9. The apparatus according to claim 8, wherein said arcuated surface is formed with respect to said first rotating shaft as the center thereof.

10. The apparatus according to claim 7, wherein said engaging portion has a roller member brought into rolling contact with said first end of said locking lever.

* * * * *